(No Model.) 4 Sheets—Sheet 1.
W. H. HOLLAR & F. S. HOLMES.
ELECTRIC SAFE LOCK.
No. 438,236. Patented Oct. 14, 1890.
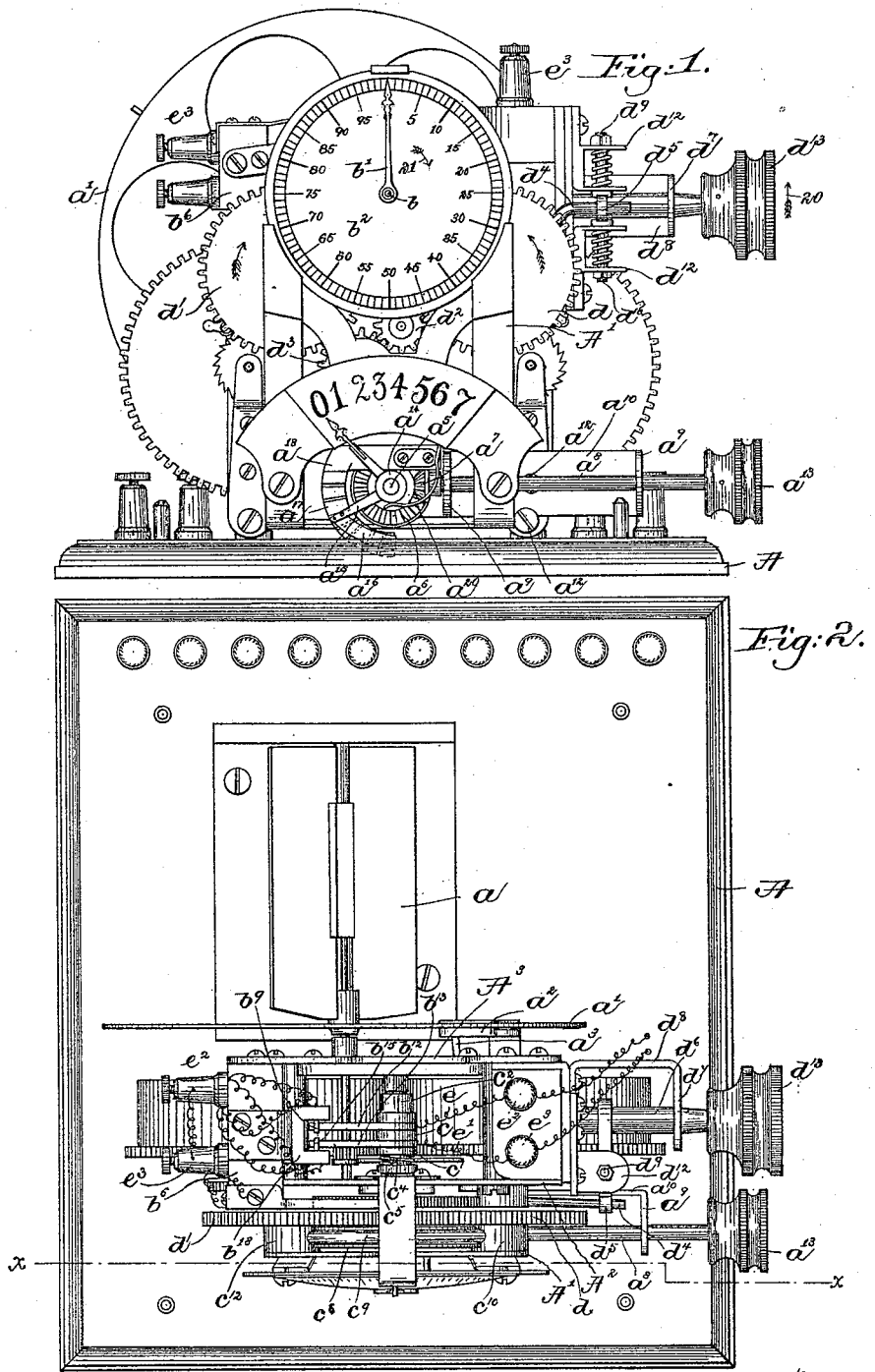

(No Model.) 4 Sheets—Sheet 2.
W. H. HOLLAR & F. S. HOLMES.
ELECTRIC SAFE LOCK.
No. 438,236. Patented Oct. 14, 1890.
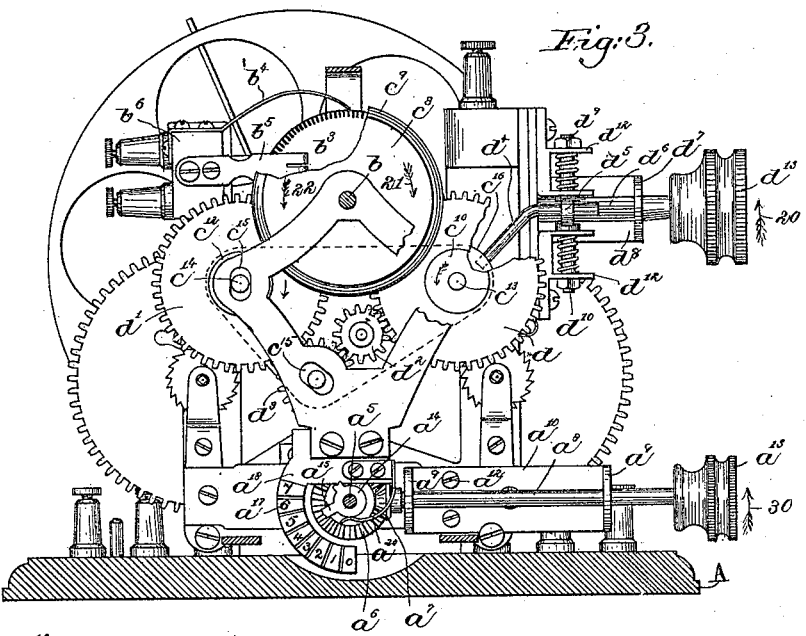
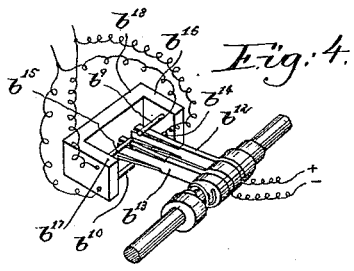
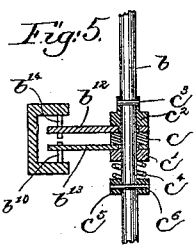
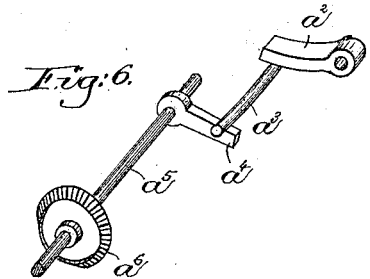
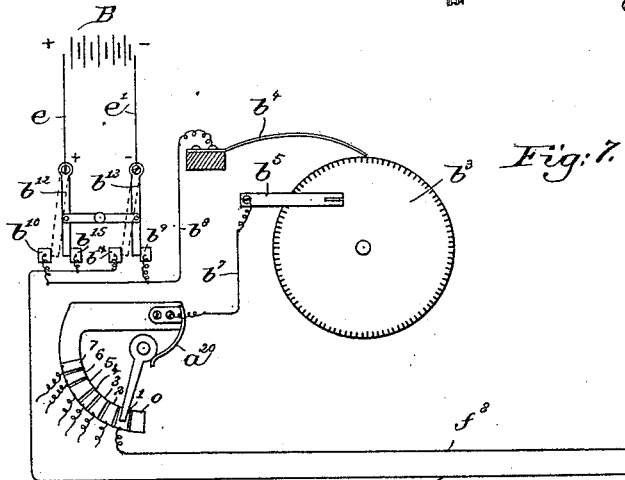
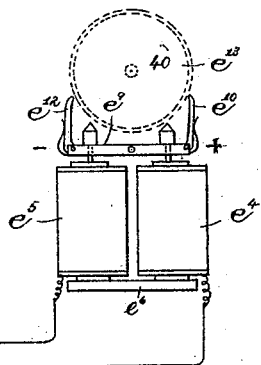
Witnesses.
Howard F. Eaton.
Frederick L. Emery.
Inventor:
William H. Hollar,
Frederick S. Holmes,
by Jenney & Gregory Attys

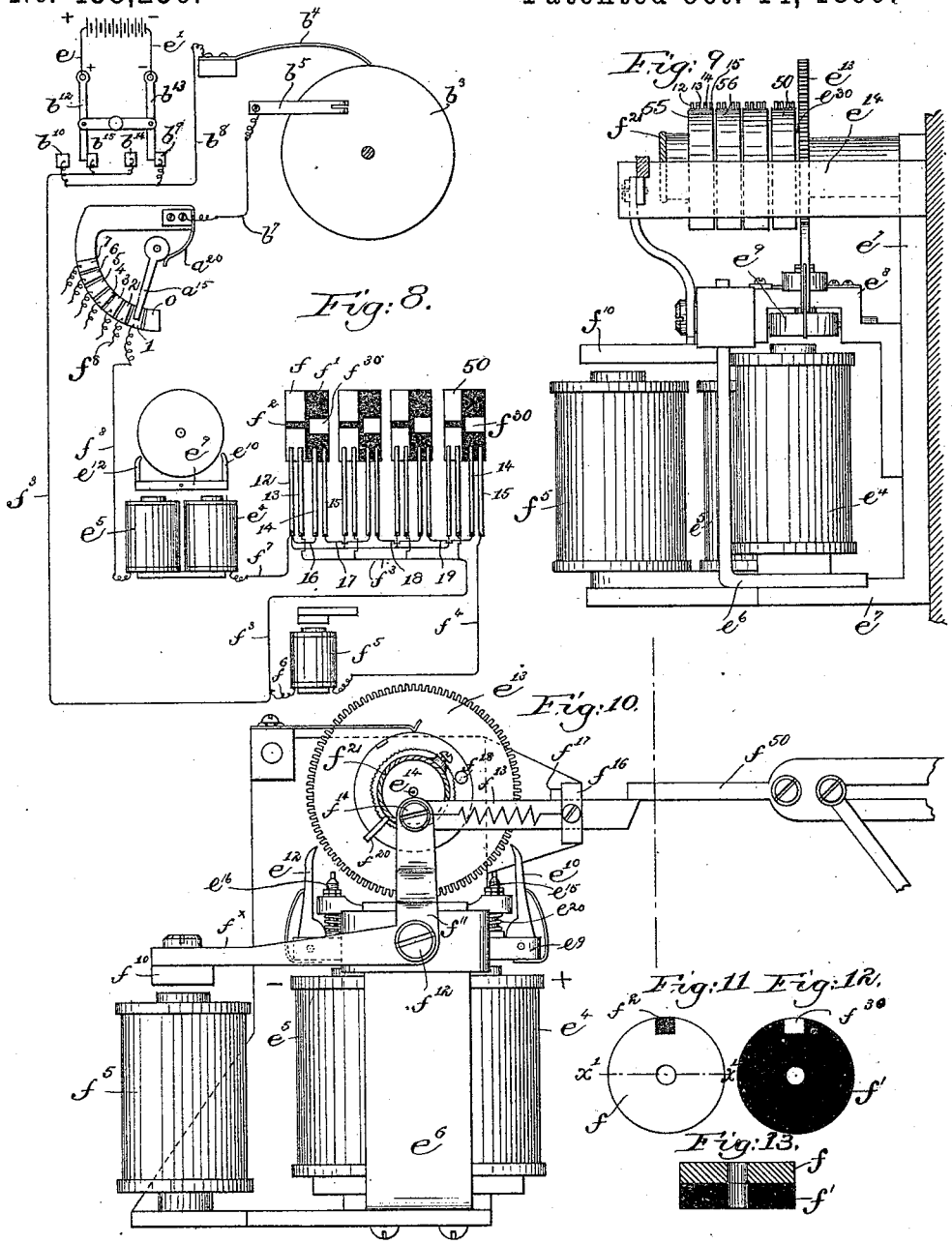

(No Model.) 4 Sheets—Sheet 4.
W. H. HOLLAR & F. S. HOLMES.
ELECTRIC SAFE LOCK.
No. 438,236. Patented Oct. 14, 1890.
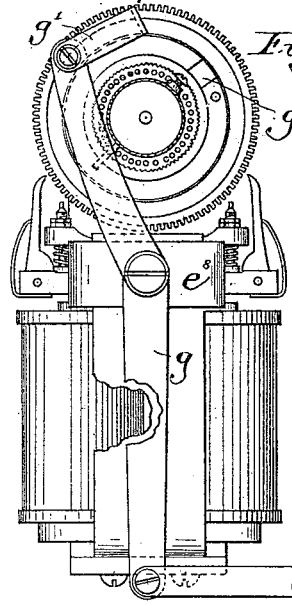
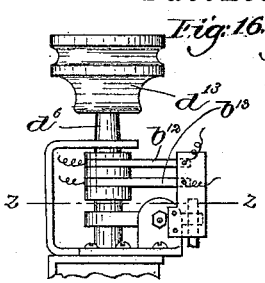
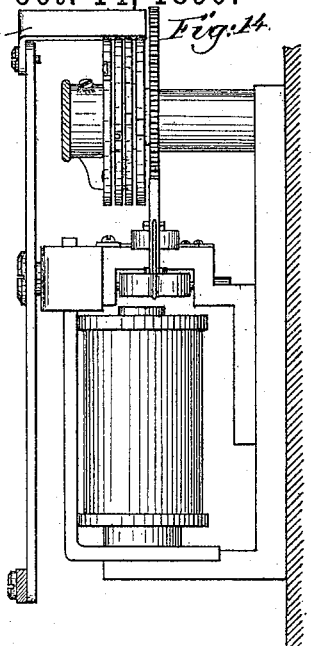
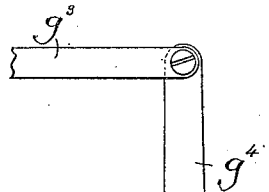
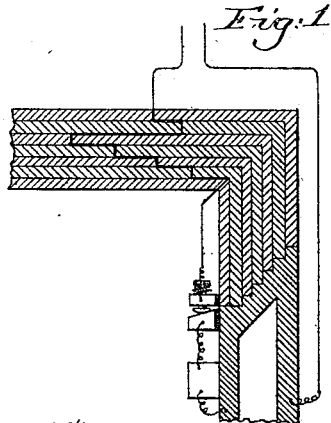
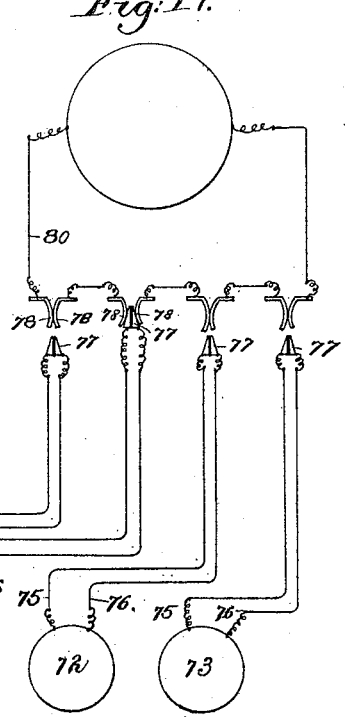
Witnesses.
Howard J. Eaton.
Frederick L. Emery.
Inventor:
William H. Hollar,
Frederick S. Holmes,
by Crosby & Gregory
Attys

UNITED STATES PATENT OFFICE.

WILLIAM H. HOLLAR, OF ELIZABETH, NEW JERSEY, AND FREDERICK S. HOLMES, OF MALDEN, MASSACHUSETTS, ASSIGNORS TO JAMES W. TORREY, OF MERCHANTVILLE, NEW JERSEY.

ELECTRIC SAFE-LOCK.

SPECIFICATION forming part of Letters Patent No. 438,236, dated October 14, 1890.

Application filed February 3, 1890. Serial No. 338,955. (No model.)

*To all whom it may concern:*

Be it known that we, WILLIAM H. HOLLAR, of Elizabeth, county of Union, State of New Jersey, and FREDERICK S. HOLMES, of Malden, county of Middlesex, State of Massachusetts, have invented an Improvement in Electric Safe-Locks, of which the following description, in connection with the accompanying drawings, is a specification, like letters on the drawings representing like parts.

This invention has for its object to provide apparatus by which a combination-bolt or other locking mechanism employed on safes or vaults, bonded warehouses, and other depositories for valuables may be electrically controlled at any given point or points, as from a main or other station.

Our improved electric controlling apparatus may be used in connection with one or more of a series of electrically-actuated locks, whereby any desired number of said locks may be controlled simultaneously or separately.

The controlling apparatus may be used to control the electrically-actuated combination-lock, which, if desired, may be used in connection with a time-lock, so that in case the time-lock fails to operate—as, for instance, in case the time-lock becomes disconnected or broken from the bolt mechanism—the operation of the bolt mechanism may be controlled by the electrically-actuated combination-lock.

The particular features in which our invention consists will be pointed out in the claims at the end of this specification.

Other features of our invention will be pointed out in the claims at the end of this specification.

Figure 1 is a front elevation of an electric controlling apparatus embodying our invention; Fig. 2, a top or plan view of the apparatus shown in Fig. 1; Fig. 3, a transverse section of the apparatus shown in Fig. 2 on line $x\ x$; Figs. 4 and 5, details of a pole-changer to be referred to, Fig. 5 being a transverse section of Fig. 4; Fig. 6, a detail of a brake mechanism to be referred to; Figs. 7 and 8, diagrams of circuits to more clearly illustrate the operation of our improved apparatus; Fig. 9, a detail in side elevation of a lock-operating mechanism; Fig. 10, a front view, looking toward the right, in Fig. 9; Figs. 11, 12, and 13, details to be referred to, Fig. 13 being a section of Fig. 11 on line $x'\ x'$; Fig. 14, a side elevation of a modified form of lock-operating mechanism; Fig. 15, a front elevation of the lock-operating mechanism shown in Fig. 14, looking toward the right; Fig. 16, a modified form of pole-changer; Fig. 17, a section of the pole-changer shown in Fig. 16 on line $z\ z$; Fig. 18, a detail of a portion of the safe-door; Fig. 19, a modified arrangement of circuits to be referred to, and Fig. 20 a detail to more clearly show the contact-brush.

Referring to Figs. 1, 2, and 3, A represents a base of wood or other suitable material, to which are secured uprights $A'\ A^2\ A^3$, constituting a frame-work to support the working parts of our improved controlling apparatus, as will be described.

The uprights $A^2\ A^3$ form bearings for the shafts of a clock or other time movements, which may be of any usual or well-known construction, it being herein shown as provided with a fan $a$, having secured to or forming part of it, a brake wheel or disk $a'$, with which co-operates a brake-shoe $a^2$, (see Figs. 2 and 6,) the said brake-shoe being pivoted to the upright $A^3$, and having secured to or forming part of it, as herein shown, a rod $a^3$, normally resting upon a dog or arm $a^4$, on a shaft $a^5$, provided with a bevel-gear $a^6$. The bevel-gear $a^6$ meshes with a bevel-pinion $a^7$, mounted on a shaft $a^8$, having bearings in arms $a^9$, of a bracket $a^{10}$, secured, as shown, to the upright $A^2$, by screws $a^{12}$, the said shaft being provided, as shown, with a thumb-piece or handle $a^{13}$, by rotating which the shaft $a^8$ may be turned to engage the brake-shoe $a^2$ with the periphery of the disk $a'$ to stop the clock-work or to disengage the said brake-shoe from the said disk to start the clock-work. The shaft $a^5$ has mounted upon it, as herein shown, a hub $a^{14}$, provided with an arm $a^{15}$, to which is secured a commutator-brush $a^{16}$, which co-operates with a commutator composed of a series of segments or contact plates or strips $a^{17}$, secured to a block or piece $a^{18}$ of insulating material, the said insulating-block having secured to it a contact-arm $a^{20}$, bearing upon the hub $a^{14}$. The insulating-block $a^{18}$, as herein shown, has secured to it eight commutator-strips $a^{17}$, marked 0 1 2 3 4 5 6 7, each commutator-strip, except the one marked 0, forming one terminal of a circuit, the co-operating terminal of which, as herein shown in Fig. 1, is the brush $a^{16}$, the commutator-strip 0 being of insulating material to positively break or open the circuit when the brush $a^{16}$ is in contact therewith.

The uprights $A'$ $A^2$ form journal-bearings for a shaft $b$, to which is secured a pointer or index $b'$, co-operating with a graduated dial $b^2$, the said shaft having mounted on it a break or commutator wheel $b^3$, which may be of any ordinary construction, but which in the present instance is shown as a toothed wheel provided with insulation between the said teeth, the said wheel having as many teeth as there are graduations on the dial $b^2$, the said commutator-wheel constituting a circuit-breaker, by which the operation of the bolt-operating mechanism is controlled, as will be described. The break-wheel $b^3$ has co-operating with it two contact pens or brushes $b^4$ $b^5$, secured to a block $b^6$ of insulating material, supported by the uprights $A^2$ $A^3$. The brush $b^5$ is connected by wire $b^7$ (see Fig. 7) to the arm $a^{20}$, and the brush $b^4$ is connected by wire $b^8$ to two poles or contact-points $b^9$ $b^{10}$ of a pole-changer, which may be of any usual construction, but which is herein shown as consisting of two arms $b^{12}$ $b^{13}$, loosely mounted on the shaft $b$, (see Figs. 4 and 5,) but insulated therefrom and having their ends movable between the contact-points $b^9$ $b^{10}$ and a second set of contact points or poles $b^{14}$ $b^{15}$, (shown as pins,) extended through opposite sides $b^{16}$ $b^{17}$ of a piece $b^{18}$ of insulating material (see Fig. 4) secured to or forming part of the insulating-block $b^6$. The arms $b^{12}$ $b^{13}$ are separated by a ring $c$ of insulating material, (see Fig. 5,) and on the opposite side of the arm $b^{12}$ is mounted a hub $c^2$ of insulating material firmly secured to the shaft $b$, as by a pin $c^3$. The shaft $b$ also has mounted on it a loose ring $c'$, which is kept pressed against the arm $b^{13}$ by a spring $c^4$, encircling the shaft $b$ and located between the ring $c'$ and the hub $c^5$, secured to the shaft, as by a pin $c^6$. The shaft $b$ is rotated in opposite directions to bring the arms $b^{12}$ $b^{13}$ in contact with one set of poles and then with the other by means of a reversing mechanism, consisting, as herein shown, of a disk $c^8$ of insulating material provided with a rubber band or tire $c^9$, with which co-operates two friction-hubs $c^{10}$ $c^{12}$ (see Fig. 3) on shafts $c^{13}$ $c^{14}$, having one end extended into slots $c^{15}$ in the upright A and their other ends joined by a plate $c^{16}$. (Indicated by dotted lines, Fig. 3.) The shafts $c^{13}$ $c^{14}$ have mounted on them gears $d$ $d'$, rotated in opposite directions by pinions $d^2$ $d^3$ in mesh with each other, the pinion $d^2$ meshing with the gear $d$ and the pinion $d^3$ with the gear $d'$, the pinion $d^2$ being driven by the clock-work, and the pinion $d^3$, having one journal extended into a slot $c^{15}$ in the upright A, and its other journal mounted in the plate $c^{16}$. The plate $c^{16}$ has secured to or forming part of it a rod $d^4$, having one end extended through a slot or opening in an arm $d^5$, fast on a shaft $d^6$, supported in the end $d^7$ of a bracket $d^8$, secured to or forming part of the upright $A^3$. The shaft $d^6$ is normally maintained in such position as to keep the friction-hubs $c^{10}$ $c^{12}$ out of contact with the friction-disk $c^8$, as herein shown, by means of spring-actuated rods $d^9$ $d^{10}$, extended through openings in suitable bars or plates $d^{12}$ and normally bearing against the opposite sides of the arm $d^5$. The shaft $d^6$ is provided, as shown, with a thumb piece or handle $d^{13}$, by which the said shaft may be rotated in one direction—for instance, as indicated by arrow 20, Figs. 1 and 3, to move the friction-hub $c^{10}$ up into contact with the friction-disk $c^8$ and produce rotation of the said disk in one direction, as indicated by arrow 21, Figs. 1 and 3; or the said shaft may be turned in the direction opposite to that indicated by arrow 20 to bring the friction-hub $c^{12}$ into contact with the friction-disk $c^8$, and thereby produce rotation of the said friction-disk in the direction of arrow 22. As the friction-disk $c^8$ is rotated in either direction, the pointer or index $b'$ is rotated in the same direction. The arms $b^{12}$ $b^{13}$ of the pole-changer are connected, respectively, by wires $e$ $e'$ to the positive and negative poles of a battery B, (see Fig. 7,) the said wires being shown as made in two parts in Fig. 2 and secured to binding-posts $e^2$ $e^3$.

The apparatus thus far described constitutes the controlling-instrument of our improved apparatus, and in practice the said instrument will be located at a central point or station and is to be accessible to only authorized persons. For instance, it may be located at the main office of a safe-deposit or trust company or at the president's house, or at any other desired point.

Our improved controlling-instrument is designed to operate an electrically-actuated combination-lock controlling the bolt-operating mechanism of one or more or any desired number of safes, vaults, or other receptacles, and for sake of simplicity we shall hereinafter describe our invention with relation to a safe.

In accordance with our invention each safe has located within it, preferably, a polarized electro-magnet of any usual or desired construction, it being herein shown in Fig. 10 as made of two magnetic coils $e^4$ $e^5$ and a permanent magnet $e^6$, to one part of which is secured the coils $e^4$ $e^5$. The polarized magnet is herein shown as secured to a frame $e^7$, (see Fig. 9,) having secured to or forming part of it a bracket $e^8$, to which is pivoted the armature $e^9$, provided at its opposite ends with pawls $e^{10}$ $e^{12}$, pivoted on said armature. The pawls $e^{10}$ $e^{12}$ are adapted to engage the teeth of a ratchet-wheel $e^{13}$, mounted on a stud $e^{14}$, projecting from the frame $e^7$, and the said armature is kept in its normal position with the pawls out of engagement with the said ratchet-wheel by a suitable spring or springs, it being herein shown as normally maintained in its central position by spring-actuated rods or bars $e^{15} e^{16}$, constituting a centering device for the said armature and at the same time a locking device for the ratchet-wheel, as will be described. The ratchet-wheel is loose on the shaft $e^{14}$ and is provided, preferably, with a stud or pin $e^{30}$, extended into a recess or groove on one face of a tumbler loose on the shaft $e^{14}$ and marked 50 in Fig. 9, there being four tumblers herein shown. The tumbler 50 has a shoulder against which the pin is brought in contact by the rotation of the said ratchet-wheel. The remaining tumblers are provided in similar manner with studs and grooves; but we do not desire to limit ourselves to this specific form of tumbler, as any other usual or well-known form may be employed. Each tumbler is herein shown as made in two parts, preferably, as disks $f f'$, the disk $f$ being of metal and provided with a socket or notch containing insulation $f^2$, and the disk $f'$ being of insulating material and provided, as shown, with a block $f^{30}$ of metal. Each tumbler has co-operating with it, preferably, four wipers or contact-brushes 12 13 14 15, the wiper 12 of the first tumbler being connected by wire 16 (see Fig. 8) to the wiper 14 of the said tumbler, and the wiper 13 of the first tumbler is connected to the return-wire $f^3$, joined to the poles $b^{14} b^{15}$, and the wiper 15 of the said tumbler is connected to the wiper 14 of the second tumbler, and so on, as clearly shown in Fig. 8, the wiper 15 of the last tumbler being connected by wire $f^4$ to an auxiliary magnet $f^5$, joined by wire $f^6$ to the return-wire $f^3$. The magnet $e^4$ of the polarized magnet is connected by wire $f^7$ to the wiper 12 of the first tumbler, and the magnet $e^5$ by wire $f^8$ to one of the commutator-strips. (Herein shown as the strip 7.) The auxiliary magnet $f^5$ has its armature $f^{10}$ operatively connected to the bolt-operating mechanism, which may be of any desired or usual construction, it consisting, as herein shown, of an elbow-lever $f^x$, pivoted as at $f^{12}$, and a bar or rod $f^{13}$, pivoted to said lever, as at $f^{14}$, the said rod or bar being shown in Fig. 10 as supported by a suitable guide $f^{16}$, and provided with a suitable shoulder $f^{17}$, normally abutting against the guide $f^{16}$, and constituting a stop for the outward movement of the rod $f^{13}$, the end of the rod $f^{13}$ being extended into the path of movement of the rod $f^{50}$, which may be supposed to be connected with the bolt-work of the safe.

As represented in Figs. 7 and 8, our improved controlling mechanism is supposed to control the unlocking of seven safes or vaults, there being seven circuits connected to the commutator-strips, the wire $f^3$ forming a common return for all the said circuits. Each circuit contains a polarized electro-magnet for operating the tumblers, and an electro-magnet in a branch or shunt circuit for operating the bolt mechanism. The combination of the locks in all the circuits may be alike, or the said combinations may be unlike.

The operation of the apparatus is as follows, viz: The operator at the central station first turns the thumb-piece $a^{13}$ in the direction indicated by arrow 30, Fig. 3, until the brush $a^{16}$ is brought in contact with the desired commutator-strip $a^{17}$, which, for instance, may be supposed to be the contact-strip 1, as represented in Figs. 7 and 8. As the thumb-piece $a^{13}$ is rotated in the direction of arrow 30, the bevel-gear $a^6$ is rotated by the bevel-pinion $a^7$, and the dog $a^4$ is moved down away from the arm $a^3$ on the brake-shoe, thus permitting the latter to drop away from the brake-wheel and start the clock-work and produce rotation of the gears $d$ $d'$ and their shafts $c^{13}$ $c^{14}$. As soon as the clock-work is started, the operator turns the thumb-piece $d^{13}$ in the direction indicated by arrow 20 or in the opposite direction, according to which direction it is desired to move the ratchet-wheel $e^{13}$ in the safe or vault. Let it be supposed that the thumb-piece $d^{13}$ is turned in the direction of arrow 20. In this case the friction-hub $c^{10}$ is brought in contact with the friction-wheel $c^8$, and the latter, its shaft, and the pointer are rotated in the direction indicated by arrow 21, and the arms $b^{12} b^{13}$ of the pole-changer brought in contact with the poles $b^9 b^{15}$, thus closing the circuit of the coils $e^4 e^5$ of the polarized magnet and causing the coil $e^4$ to attract the armature and move the pawl $e^{12}$ into engagement with the ratchet-wheel $e^{13}$ and rotate it one tooth. The circuit of the coils is broken as an insulating-strip of the circuit-breaking wheel $b^3$ passes under the pen or brush $b^4$, and at each break in the circuit the armature $e^9$ is restored to its central or normal position by the spring. The friction-hub $c^{10}$ is maintained in contact with the friction-wheel until the ratchet-wheel $e^{13}$ has been revolved the requisite number of times to bring the stud or pin $f^{18}$ on the first tumbler (marked 55) in Fig. 9 into contact with an arm $f^{20}$, (see Fig. 10,) secured to or forming part of a cap $f^{21}$, fast on the shaft $e^{14}$. As soon as the stud or pin $f^{18}$ comes in contact with the arm $f^{20}$, which is indicated by the pointer $b'$ having reached the desired graduation or number on the dial $b^2$ of the transmitting-instrument, the operator turns the thumb-piece $b^{13}$ in the direction opposite to that indicated by the arrow 20, and brings the friction-hub $c^{12}$ in contact with the friction-wheel $c^8$, thus producing rotation of the said friction-wheel in the direction of arrow 22, Fig. 3, and moving the circuit-breaking wheel $b^3$ and its shaft $b$ in the same direction. As the shaft $b$ is rotated in the direction indicated by arrow 22, the arms $b^{12} b^{13}$ of the pole-changer are brought in contact with the poles $b^{10} b^{14}$, as indicated by dotted lines, Fig. 7, and with the arms $b^{12} b^{13}$ in contact with the poles $b^{10} b^{14}$ the magnet-coil $e^5$ is energized and the armature $e^9$ attracted by the said coil, and the ratchet-wheel $e^{13}$ rotated in the direction indicated by arrow 40, the circuit being traced from the positive pole of the battery by wire $e$, arm $b^{12}$, pole $b^{10}$, wire $b^8$, brush $b^4$, wheel $b^3$, brush $b^5$, wire $b^7$, arms $a^{20}$ $a^{15}$, contact-brush $a^{16}$, wire $f^8$, through the coils $e^5$ $e^4$, wire $f^7$, wipers 12, 13, wire $f^3$, pole $b^{14}$, wire $e'$, to the negative pole of the battery. As the break-wheel $b^3$ revolves under the pen $b^4$, the circuit is broken, as described, and the ratchet-wheel $e^{13}$ is intermittently rotated to move the tumblers until the second tumbler (marked 56) has become stationary with relation to the tumbler 55. In this way the friction-wheel $c^8$ is rotated in opposite directions until the pointer $b'$ has been turned on the dial $b^2$ in opposite directions a sufficient number of times to bring the metal block $f^3$ of each tumbler in contact with the pens or wipers 14 15, co-operating therewith, and as soon as the tumbler 50 has been revolved into such position that its metal block $f^3$ remains stationary under the pens 14 15 the circuit of the auxiliary magnet $f^5$ will be closed, the metal blocks of all the tumblers being at such time in contact with the pens or wipers 14 15.

The circuit of the auxiliary magnet may be traced as follows: (See Fig. 8.) From the positive pole by wire $e$, arm $b^{12}$, pole $b^{10}$, wire $b^8$, pen-brush $b^4$, wheel $b^3$, pen $b^5$, wire $b^7$, arms $a^{20}$ $a^{15}$, brush $a^{16}$, wire $f^8$, magnet $e^5$, wire $f^7$, wiper 12, wire 16, wipers 14 15 of the tumbler 55, wire 17, wipers 14 15 of the next tumbler, wire 18 and wipers 14 15 of the next tumbler, wire 19, wipers 14 15 of the last tumbler; thence by wire $f^4$, magnet $f^5$, wire $f^6$, and return-wire $f^3$ to the pole $b^{14}$; thence by arm 13 and wire $e'$ to the negative pole of the battery.

As soon as the circuit of the auxiliary magnet $f^5$ is closed, which is effected when all the tumblers have been turned into such position that their metal blocks $f^3$ are in substantially the same horizontal line, and in contact with their co-operating wipers 14 15 the armature $f^{10}$ of the said auxiliary magnet is attracted, and the lever $f^x$ is turned on its pivot $f^{12}$, and the rod $f^{13}$ thus withdrawn away from the rod or bar $f^{50}$ of the bolt mechanism, thus leaving the latter free or unlocked, so that it will drop into position to permit the bolt mechanism to be operated and the door unlocked. It will thus be seen that any number of safes or vaults may be controlled from one point or central office by the controlling apparatus, it only being necessary to move the contact-brush $a^{16}$ into contact with the commutator-strip of the circuit connected with the said safe or vault.

Each safe or vault may have a different combination, and the operator may effect the movement of the combination at the central station by means of the pointer $b'$; but, if desired, the different safes or vaults may have the same combination, and all may be operated at the same time by making the contact-arm $a^{16}$ of such shape that it will make contact with all the commutator-strips $a^{17}$, or all the safes may be connected in one circuit, as will be described.

Referring to Fig. 18 it will be noticed that but one wire is passed through the door or wall of the safe, the other wire being connected to the outside of the safe in any suitable manner. We prefer to employ the auxiliary magnet $f^5$; but we do not desire to limit ourselves in this respect, as the said magnet may be dispensed with and the bolt-operating mechanism operated mechanically—as, for instance, as shown in Figs. 14 and 15.

Referring to Fig. 15, the bracket $e^8$ has pivoted upon it a lever $g$, having loosely pivoted to it at its upper end a bent arm $g'$, extended over and so as to rest upon the peripheries of the tumblers. In this case each tumbler is provided with a notch $g^2$, and when the notches of all the tumblers have been brought into line with each other by means of the ratchet-wheel $e^{13}$, as above described, the arm $g'$ falls by gravity into the said notches, and when the armature is again attracted, all the tumblers are moved simultaneously by the ratchet-wheel in the direction to turn the lever $g$ on its pivot and through the connecting-rod $g^3$ and lever $g^4$ operate the bolt mechanism $f^{50}$. So, also, we do not desire to limit ourselves to the manner shown for operating the pole-changer, as the arms $b^{12}$ $b^{13}$ of the same may be fixed upon the shaft $d^6$, (see Fig. 16,) and positively moved when the thumb-piece $b^{13}$ is turned.

Referring to Fig. 19, we have represented four safes, marked 70 71 72 73, connected independently of one another by wires 75 76, and a switch or circuit closer 77, preferably a button or plug or spring-jack of ordinary construction, to make a connection between the branch wires 75 76 and a main circuit 80, controlled by the pole-changer, the said main circuit being represented as provided with spring-arms 78, between which the plug or switch 77 is inserted and which when the said plug is withdrawn come together to complete the main circuit between these points, so that when all the plugs are out the main circuit is closed and in condition to be opened by a plug-switch to cut in the branch circuit in which the safe is connected.

I claim—

1. The combination, with an electrically-actuated combination-lock arranged within a safe or other receptacle and comprising a series of tumblers and a ratchet-wheel to operate them, and a polarized electro-magnet located in said safe to rotate said ratchet-wheel, of a pole-changer located outside the safe and connected in circuit with said polarized electro-magnet, an electric generator connected to said polarized magnet through said pole-changer, and a circuit-breaker to control the operation of the said magnet, substantially as described.

2. The combination, with a lock arranged within a safe or other receptacle and consisting of a series of tumblers, and a ratchet-wheel to operate said tumblers, of a polarized electro-magnet located in said safe or receptacle to rotate said ratchet-wheel, an electric generator, a controlling-instrument located outside the safe and consisting of a pole-changer connected in circuit with the said polarized electro-magnet, a break-wheel $b^3$ in circuit with said pole-changer, a dial, a pointer, and a reversing mechanism to produce opposite rotations of the said pointer and break-wheel, substantially as described.

3. The combination, with a series of locks arranged within a series of safes or receptacles and each consisting of a series of tumblers, and a ratchet-wheel to operate said tumblers, of a polarized electro-magnet located in each receptacle, an electric generator, a pole-changer connected in circuit with the polarized electro-magnet, a circuit-breaker, a commutator having its segments connected in circuit with the electro-magnets, and a brush co-operating with the said segments and adapted to complete the circuits of the said polarized electro-magnets, whereby each safe or receptacle may be operated individually or simultaneously, substantially as described.

4. The combination, with an electrically-actuated combination-lock arranged within a safe or other receptacle and comprising a series of tumblers, a ratchet-wheel to operate said tumblers, a polarized magnet located in said safe to rotate said ratchet-wheel, a bolt mechanism, and an auxiliary magnet energized through said tumblers to control said bolt mechanism, of an electric generator and a pole-changer located outside said safe and connected to the polarized electro-magnet to produce reverse rotations of the ratchet-wheel, and a circuit-breaker, substantially as and for the purpose specified.

5. The combination, with an electrically-actuated combination-lock arranged within a safe or other receptacle and comprising a series of tumblers, a ratchet-wheel to operate said tumblers, a polarized magnet located in said safe to rotate said ratchet-wheel, a bolt mechanism, and an auxiliary magnet energized through said tumblers to control said bolt mechanism, of an electric generator and a controlling-instrument consisting, essentially, of a break-wheel connected in circuit with the polarized electro-magnet, a pole-changer, a dial and pointer co-operating with said dial, a friction-disk, and a reversing mechanism co-operating with said friction-disk to control the rotating of said pointer and break-wheel, substantially as described.

6. The combination, with an electrically-actuated combination-lock arranged within a safe or other receptacle and comprising a series of tumblers, a ratchet-wheel to operate said tumblers, a polarized electro-magnet located in said safe to rotate said ratchet-wheel, and a bolt mechanism controlled by said tumblers, of an electric generator and a controlling-instrument consisting, essentially, of a break-wheel connected in circuit with the polarized electro magnet, a dial, a pointer co-operating with said dial, a pole-changer, a friction-disk, and a reversing mechanism co-operating with said friction-disk to control the rotation of said pointer and break-wheel, substantially as described.

7. The combination, with an electrically-actuated combination-lock arranged within a safe or other receptacle and comprising a series of tumblers, and a polarized electro-magnet located in said safe to operate said tumblers, of a bolt mechanism controlled by said tumblers, an electric generator, a controlling-instrument consisting, essentially, of a pole-changer connected to the polarized electro-magnet, a dial and pointer co-operating therewith, a friction-disk, and a reversing mechanism co-operating with said friction-disk to control the rotating of said pointer and break-wheel, substantially as described.

8. The combination, with an electrically-actuated combination-lock arranged within a safe or receptacle and consisting of a series of tumblers, a ratchet-wheel to operate said tumblers, and a polarized electro-magnet located in said safe to rotate said ratchet-wheel, of an electric generator, a break-wheel $b^3$, connected in circuit with the polarized electro-magnet, a pole-changer, and a reversing mechanism to produce opposite rotations of the said break-wheel, substantially as described.

In testimony whereof we have signed our names to this specification in the presence of two subscribing witnesses.

WILLIAM H. HOLLAR.
FREDERICK S. HOLMES.

Witnesses:
GEO. W. ADAMS,
BENJ. S. BANKS.